J. S. BAKER.
AUTOMATIC COOKING MECHANISM.
APPLICATION FILED JULY 14, 1913.

1,181,057.

Patented Apr. 25, 1916.
4 SHEETS—SHEET 3.

Inventor.
John S. Baker.
by
Attys.

Witnesses

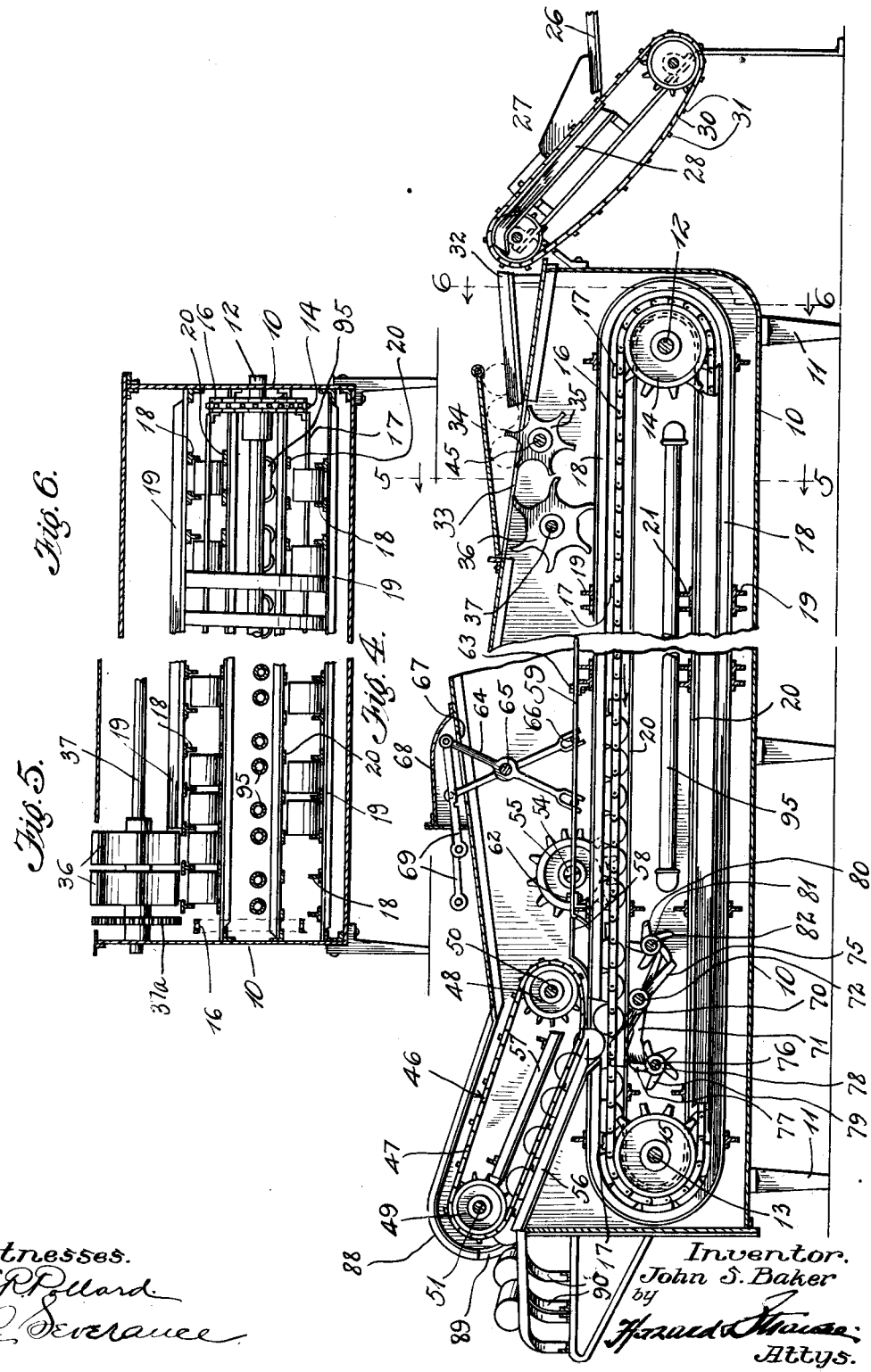

UNITED STATES PATENT OFFICE.

JOHN S. BAKER, OF LOS ANGELES, CALIFORNIA, ASSIGNOR TO BAKER-SHIPPEE MANUFACTURING CO., OF LOS ANGELES, CALIFORNIA, A CORPORATION OF CALIFORNIA.

AUTOMATIC COOKING MECHANISM.

1,181,057.   Specification of Letters Patent.   Patented Apr. 25, 1916.

Application filed July 14, 1913. Serial No. 778,927

*To all whom it may concern:*

Be it known that I, JOHN S. BAKER, a citizen of the United States, residing at Los Angeles and State of California, have invented new and useful Improvements in Automatic Cooking Mechanisms, of which the following is a specification.

This invention relates to improvements in cooking and sterilizing apparatus, and has particular reference to mechanism for automatically cooking and sterilizing materials that have been already inclosed in cans or containers.

It is an object of this invention to provide a mechanism in which one or more cans containing materials to be cooked can be passed through the same and automatically discharged therefrom when the articles have been cooked a desired length of time.

It is also an object of the invention to provide a machine of this class in which cans containing one kind of goods may be subjected to the cooking operation a given length of time, while cans containing another kind of goods which require a longer time for cooking may be placed, the different kinds of goods being discharged automatically at the proper time for limiting the cooking operation to the proper degree.

It is a further object of the invention to provide an automatic cooker having means for continuously advancing cans containing the materials to be cooked, through a heating chamber, and to provide spiral guideways therein for facilitating the continuing of the cooking operation for varying lengths of time in accordance with the time required for cooking a given material.

Figure 1:
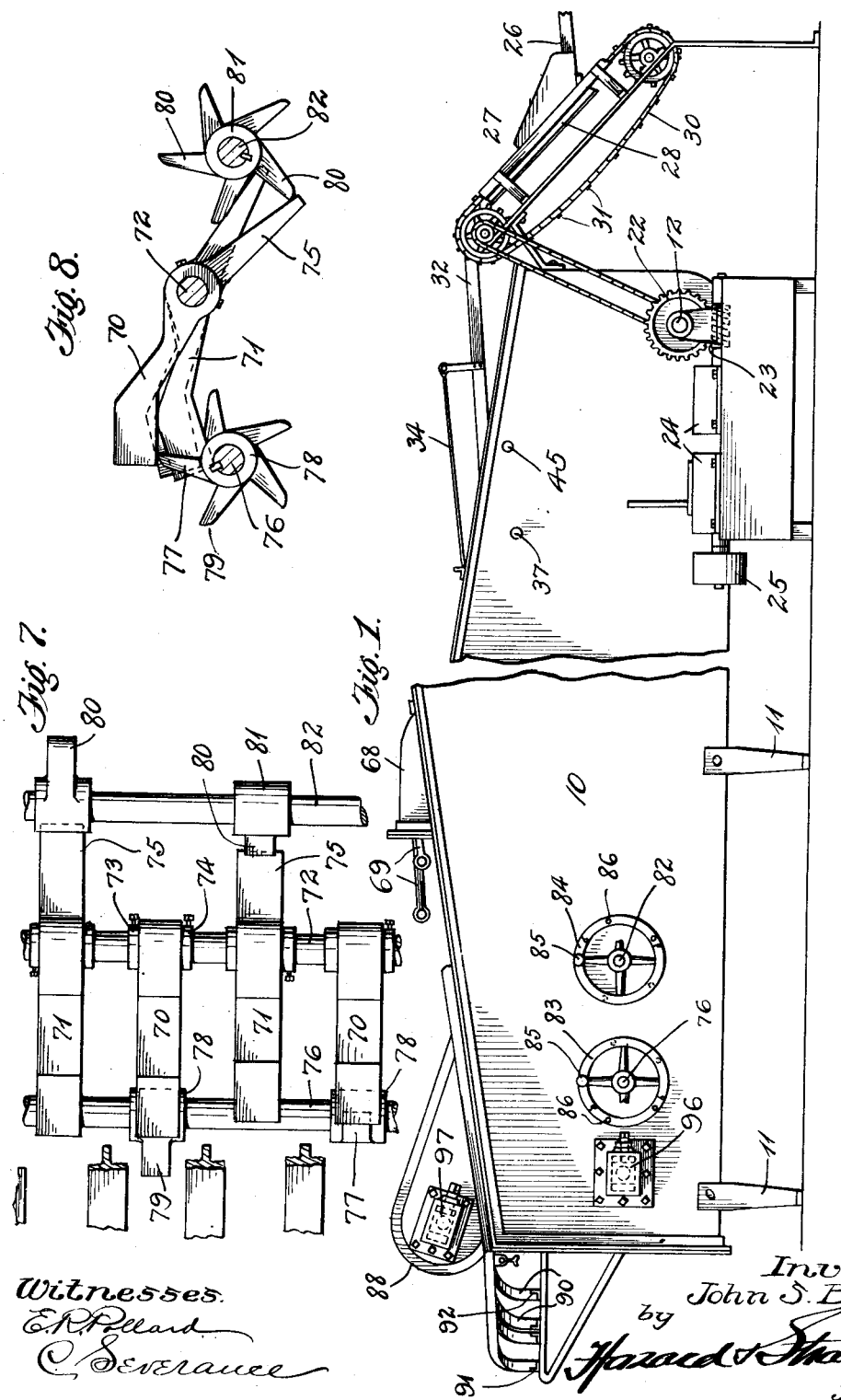
Figure 2:
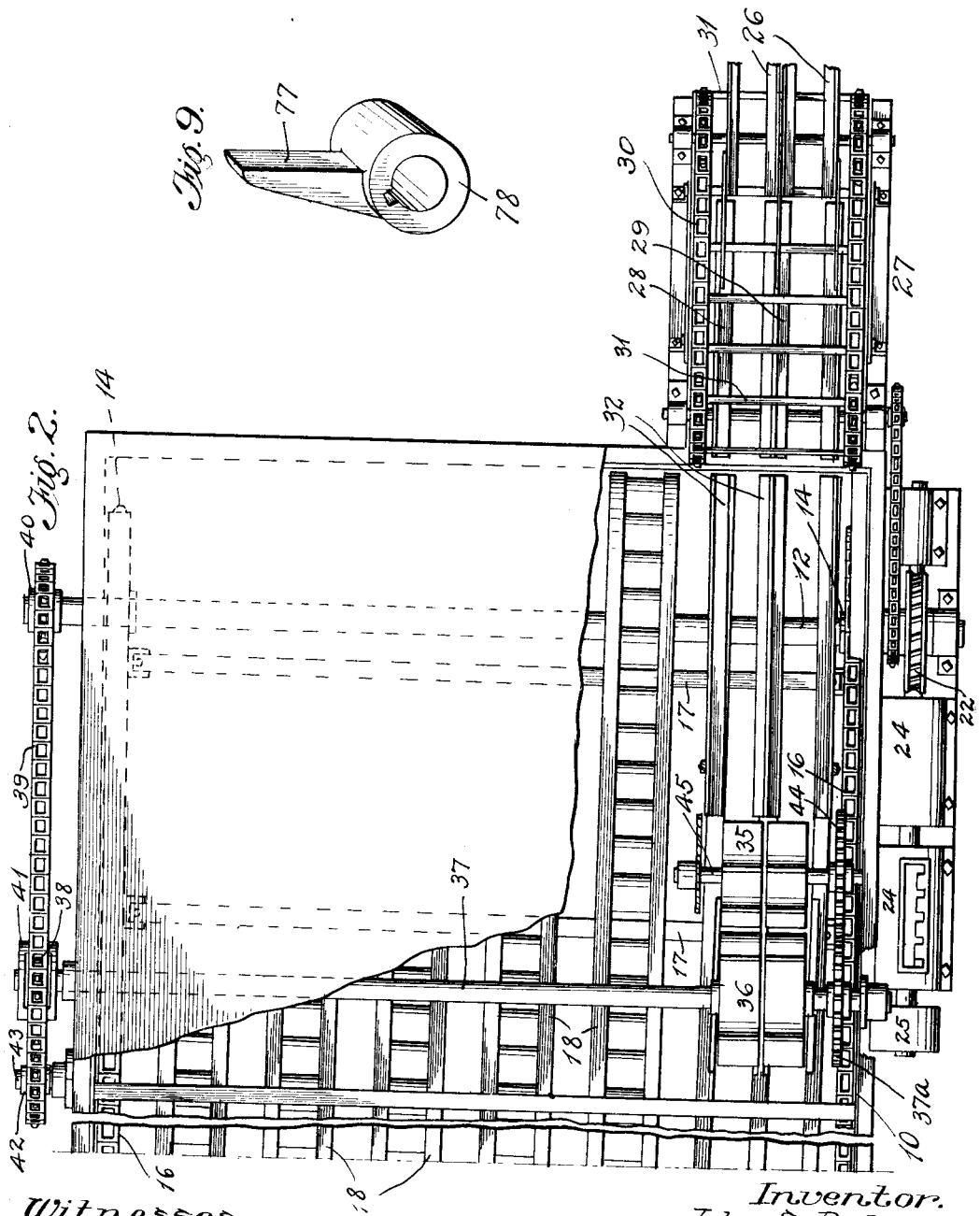
Figure 3:
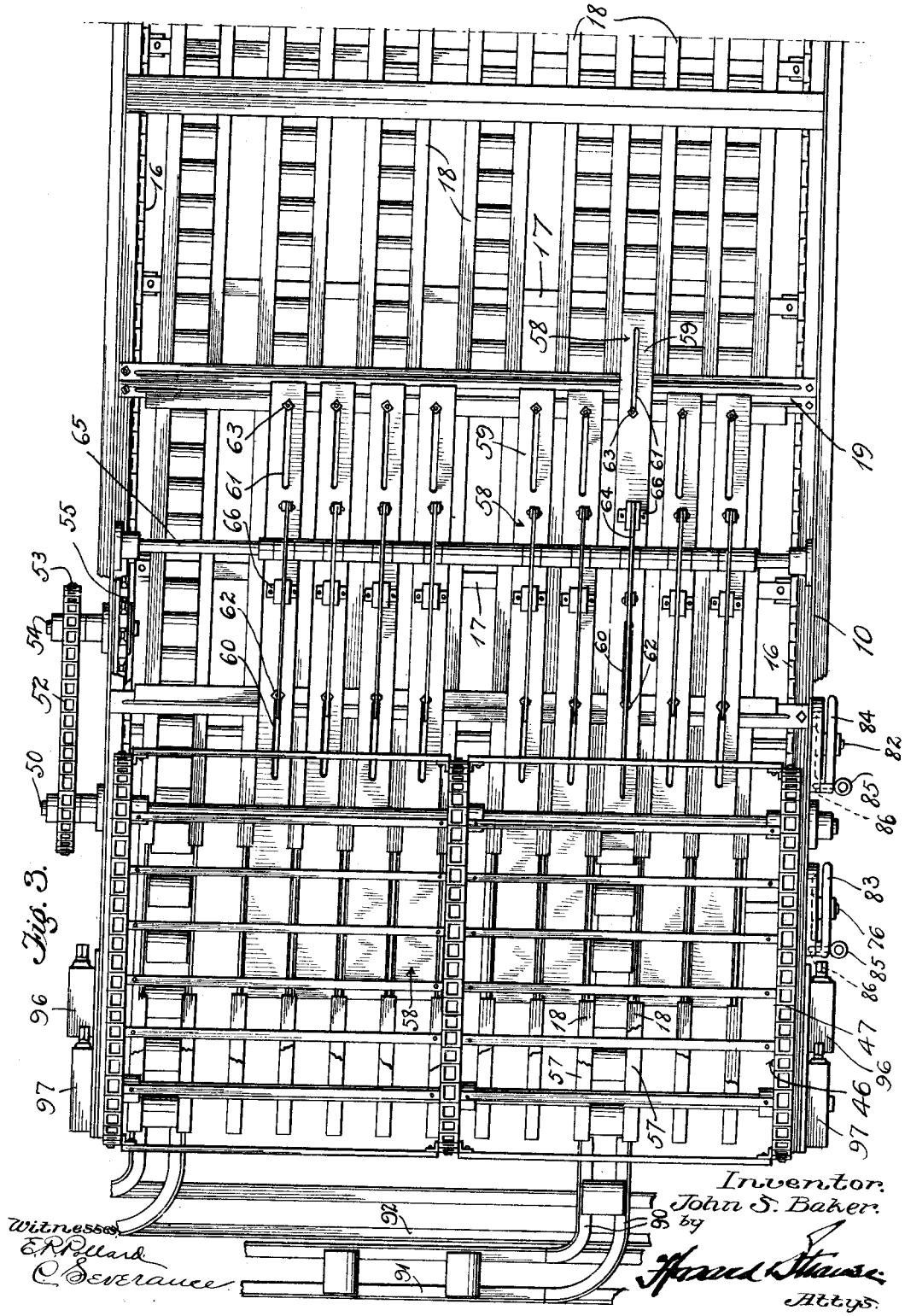

In the accompanying drawing forming a part of this specification: Figure 1 is a side elevation of the improved automatic cooking apparatus forming the subject matter of the present invention, looking at the same from the side on which the actuating power mechanism is located, the central portions thereof being broken away. Fig. 2 is a top plan view of a portion of the cooking apparatus showing the same upon an enlarged scale, a part of the top of the machine being broken away to show the interior mechanism. Fig. 3 is a similar top plan view showing the remainder of the machine, it being a continuation of the view shown in Fig. 2 and having the cover removed. Fig. 4 is a vertical longitudinal sectional view taken through the cooking apparatus, the central portions thereof being broken away. Fig. 5 is a partial transverse sectional view taken through approximately one half of the cooking apparatus on the line 5—5 of Fig. 4. Fig. 6 is a partial transverse sectional view taken through approximately half of the apparatus on the line 6—6 of Fig. 4, a portion of the tracks for guiding the cans being shown in section. Fig. 7 is a detail view in top plan showing some of the alternately arranged levers for effecting the discharge of the cans from the machine by opening different switches in the spiral can way. Fig. 8 is a detail sectional view taken to one side of one of said levers and showing the others behind the same, the spurs for operating the same being also shown. Fig. 9 is an enlarged detail perspective view of one of said spurs or arms shown in Fig. 8.

The details and features of the invention will now be more particularly described, reference being had to the said drawing in which 10 indicates a casing usually of an elongated flat type or may be cylindrical, as preferred, adapted to contain heated water, steam or hot air for heating purposes and adapted to inclose mechanism for advancing cans and directing them in their movement back and forth until the materials therein have been properly cooked. The said tank is usually made of sheet metal of any desired or necessary thickness and mounted upon standards or legs 11. The cover or top portions are inclined to facilitate the introducing and discharging of the articles to be cooked. Near the opposite ends of the casing 10 and mounted transversely thereof are shafts 12 and 13, which engage bearings carried by the casing and which carry sprocket wheels 14 and 15 upon which endless chains 16 are mounted. The sprocket wheels are mounted near the side walls of the casing upon opposite sides thereof and the parallel sprocket chains 16 moving upon said wheels are connected at suitable intervals by transverse slats 17. These slats are carried by the chains in such a way as to advance the cans of material being cooked through the casing. Coöperating with the conveyer made of such chains and slats, are guiding rollers or bars upon which the cans containing the material to be cooked are placed and caused to travel or roll. The said guiding rails 18 forming the spiral can way are preferably formed of T iron which are secured at intervals to transversely arranged supporting bars 19. Coöperating with the guide bars 18 are flat bars 20 arranged opposite them and spaced a sufficient distance therefrom to receive the canned goods between them. The arrangement of the bars 18 and 20 is important and will be discovered by reference to Figs. 2, 3, 5 and to be of such a character as to form a continuous spiral track for the cans within the casing 10. The incline or pitch of the tracks will be readily observed by reference to said Figs. 2 and 3, and also by reference to Fig. 6 in which the curved ends of two of the track portions are shown in their slightly inclined positions, the tracks have a continuous spiral pitch.

While each pair of tracks formed of the guide rails 18 and 20 may be employed as a single spiral throughout the machine or feeds may be cut in, the said tracks at intervals are preferably grouped in two or more sets running parallel about the spiral cores. For large capacities articles which require different periods of time for a proper cooking may be passed into the machine simultaneously and may each be delivered from the machine independently of the other at a suitable time to prevent under cooking or over cooking of a particular article. Thus as shown in the present drawing the guiding and supporting rails 18 and 20 are arranged in a parallel pair, cans containing different materials being accommodated in each one of the pair simultaneously as will be understood by referring to the inlet end of the mechanism shown in Fig. 2, the feeding device located at said point being hereinafter fully described.

It will be understood that after the cans have been permitted to roll into the device upon one or both of the pair of tracks provided, that the slats or bars 17 or any arrangement will continue to roll or push the cans around the said spiral tracks until they arrive at the point from which they are discharged from the casing of the machine. The sprocket chains 16 are however not set at an angle with respect to the casing as are the said tracks, but are arranged at right angles to the end and side walls of the casing. The bars or arrangements for moving cans are set square with spiral track.

The flat bars 20 are supported in position by means of transverse bars 21 which extend to the sides of the casing and are rigidly secured thereto, in the same manner as the transverse bars 19 which support guide bars 18. At the ends of the casing the spiral guide bars 18 and the flat bars 20 are curved about the axis of the shafts 12 and 13 as a center so as to be concentric with the end portions of the conveyer chains. The shaft 12 at the inlet end of the machine projects beyond the casing at each end, and one end is provided with a worm gear wheel 22, which meshes with a suitable worm 23, arranged at right angles thereto and mounted outside the casing as clearly shown in Figs. 1 and 2. Any suitable transmission mechanism 24 is employed to drive the said worm 23 and a belt wheel 25 is provided therefor and adapted for connection with any suitable source of power.

The cans containing the articles to be cooked are fed to the machine in any suitable manner and usually advanced to the same along a trough 26, which directs them to an inclined conveyer 27. The said conveyer is provided with guiding tracks 28 and 29 over which the cans roll in passing into the machine. The said conveyer is also provided with endless sprocket chains 30, arranged upon opposite sides of the conveyer and having transverse bars 31 connecting the same and adapted to advance the cans of goods to be cooked upon the said guide ways 28 and 29. The cans are deposited from the said conveyer upon a series of inclined tracks 32, preferably made of angle iron and extending from a point above the end of a casing to an opening 33 formed in the cover thereon. Above said opening 33 a cover 34 is supported as shown in Figs. 1 and 4.

At the opening 33 and mounted within the casing 10 is a feed wheel 35, which is formed with curved pockets extending transversely of its periphery, adapted to receive the cans one at a time in succession from the guide rails 32. Coöperating with the wheel 35 is a second wheel 36 which has slightly differently formed recesses in its periphery, for receiving the cans from the wheel 35, the said recesses being elongated, and the wheel traveling in the opposite direction to the wheel 35, receives the cans and passes them downwardly to the tracks formed by the spiral guide bars 18 and the bars 20, at points thereon immediately below the said wheels. The said cans will thus be in position to be engaged by the next transverse bar or propellor 17 of the conveyer that passes that point, and will be carried onwardly within the cooker, and the space between the propeller bars may be preferably of such interval as to accommodate one or a number of cans. The space between the bars 17 is usually made of a size sufficient to receive one or a number of cans between the said bars, say for instance five or six cans.

The wheels 36 are carried by a shaft 37, one end of which projects outside the wall of the casing 10 upon the opposite side thereof from the said wheels. The said shaft receives a sprocket wheel 38 outside the casing. The said sprocket wheel is connected by a sprocket chain 39 with a sprocket wheel 40 secured to the end of the shaft 12 which projects upon that side of the machine. The sprocket wheel 38 is mounted in any suitable timing mechanism 41 for driving the feed wheels 35 and 36 at a suitable rate of speed. The mechanism of the timer does not form any part of the present invention and is therefore not shown or described. Since only a part of the gear wheel 38 projects from the timer however, an idler sprocket 42 is mounted upon adjacent stub shaft 43 secured to the casing and the sprocket chain passes around the same and thence back to the sprocket wheel 40. It will be understood that the speed of the wheels 35 and 36 may be timed in any suitable manner to deposit a desired number of cans of different sizes upon the guideways within the casing. The shaft 37 is provided with a gear wheel 37ª adjacent thereto, which meshes with a gear wheel 44 carried by the shaft 45 of the said wheels 35. The said latter shaft finds journal bearings in suitable portions of the framing. By this construction the two sets of feed wheels 35 and 38 are driven in opposite directions to each other as is required.

At the opposite end of the casing from the feed wheels 35 and 36 is a discharge mechanism, comprising an inclined conveyer 46 made up of sprocket chains 47, carried by sprocket wheels 48 and 49 mounted upon transverse shafts 50 and 51 journaled at their ends in the casing. One end of the shaft 50 projects outside the casing a sufficient distance to receive a sprocket chain 52 which connects the same with a sprocket wheel 53 mounted upon a short shaft 54. The short shaft 54 projects through the adjacent wall of the casing 10 and carries inside the same a sprocket wheel 55 arranged immediately above the upper lap of one of the sprocket chains 16 so as to engage the same and be driven thereby. In this manner movement is communicated to the shaft 50 and to the traveling discharge conveyer. Adjacent to the conveyer are guideways 56 and 57 which direct the cans as they are carried upwardly by said conveyer from the interior of the machine. At the lower end of the conveyer, openings are provided in the spiral guide bars 18, sufficient breaks being left in said spiral guide bars to permit of the cans traveling upon the flat bars 20 beneath them, being elevated and passed into the discharge conveyer. Normally these openings are closed by means of slides 58 which have offset portions 59 extending still farther into the machine and having guide slots 60 and 61 engaging limiting bolts 62 and 63. These slides are located between the spiral guide bars 18 and when moved toward the discharge end of the machine cover the pathways of the cans. When they are withdrawn the pathway of one or more of the rows of cans may be exposed at the top and by the use of suitable lifting means the cans can be directed into the discharge conveyer. Levers 64 pivoted upon a transverse shaft 65 are employed for reciprocating said slides, their lower ends having forked portions engaging transverse pins 66, secured to the said slides, while their upper ends extend out through an opening 67 in the top of the casing. A housing 68 protects the said opening and receives the upper end of said levers and thrust bars 69 extend inwardly beneath said housing and have a pivotal connection with said levers 64, whereby they may be operated from the outside of the machine for setting the slides.

Beneath the openings or interrupted portions of the spiral guide bars 18 are located a series of can lifting arms 70 and 71 which are journaled upon a transverse shaft 72 mounted in the casing. Collars 73 and 74 secured to the shaft 72 hold the said lifting arms in proper spaced condition upon the said shaft 72. Every other arm, as for instance the arms 71, are provided with lever projections 75, which extend beyond the shaft 72. Below the arms 70 and 71 extends another transverse shaft 76 having at suitable intervals thereon spurs 77, carried by hubs 78 which are keyed upon the said shaft 76. The successive spurs mounted upon the said shaft 76 are set at desired angles for raising the lifting arms 70, which are needed for discharging the cans from the machine at the desired point. The said spurs 77 preferably extend from the hubs in a tangential manner and have their outer ends rounded at 79 so as to facilitate their easy movement in lifting the said arms 70. The intermediate arms 71 may also be lifted when desired by means of a series of spurs 80 carried by hubs 81 which are keyed upon a third transverse shaft 82 arranged parallel with the shafts 72 and 76. The said spurs 80 are shaped like the spurs 77 and are adapted to bear upon the upper surface of the levers 75 when one of the arms 71 is to be raised.

By providing the two shafts 76 and 81 the spurs need not be secured so closely together in the machine and the action of either set of spurs will accomplish the lifting of either the arms 70 or the arms 71 as desired. Lifting arms are provided for every space between the spiral guiding bars 18 so that the cans within the machine may be caused to pass therefrom at any point across the width of the machine, and in accordance with the time which it was desired to keep the canned goods within the cooker.

The shafts 76 and 81 extend through the side walls of the casing 10 upon one side of the machine and are provided with hand wheels 83 and 84 by which they may be turned for lifting the desired arms 70 and 71. Each of said wheels is provided with a pin 85, which may be thrust into apertures 86, upon a ring projection adjacent thereto on the wall of the casing 10. By setting the pins in any of said apertures after the wheels have been turned, the lifting arms 70 and 71 will be positively held in adjusted positions.

When the desired lifting arms have been adjusted and the slides 58 correspondingly adjusted, the cans in the line beneath which the arms 70 or 71 have been lifted will, upon engaging the inclined surface of said arms, be driven upwardly through the openings in the guide bars 18 and upon the inclined guides 56. There they will be engaged by transverse slats or bars 87 carried by the chains of the conveyer 46 and caused to roll upwardly upon said guides 56. The conveyer 46 is inclosed by a housing 88 which forms an extension of the cover of the casing 10 and which is provided with a discharge opening 89 extending the full width of the machine.

Curved track sections 90 are movably mounted opposite the discharge openings 89, their inner ends being adapted to rest upon the adjacent edge of the casing 10 while their outer ends rest upon transverse tracks 91 and 92. As seen in Fig. 3, two lines of cans are being discharged from the machine, one set of cans being lifted by the conveyer and being allowed to roll outwardly upon the track sections 90 to the track 91. These cans have of course not been left in the cooker a great while. The other cans being discharged have been carried the entire way through the cooker and thus allowed to cook a very much longer time and are being discharged upon the track 92.

It will be understood from the above description that the cans could be discharged from any point transversely of the spiral can way by manipulating the slides 58 and the lifting arms 70 and 71, so as to lift the cans from the guiding and supporting tracks at any point upon the spiral mechanism thereof and by also moving the curved track sections 90 opposite the lifting arms that have been elevated.

As heretofore observed the machine illustrated in the drawing is adapted to receive two sets of articles to be cooked, entering in a parallel manner between two adjacent sets of spiral can ways. These travel side by side but the line of cans which contains goods which does not need to be cooked so long as the other, is discharged first and the other is permitted to travel through the mechanism as long as necessary.

The casing 10 is preferably filled with water so as to completely cover the cans, may be steam or any suitable heat, while they are traveling upon the guiding and supporting rails and the water is heated to any desired degree for accomplishing the cooking operation, the heat being usually introduced by means of a heating coil 95 the flared portions of which extend back and forth lengthwise of the casing 10 between the laps of the conveyer 16. Steam or other heat may be introduced in said coil in any preferred manner. The ends of the shafts 13 and 51 are preferably mounted in adjustable journal bearings 96 and 97 by which any slackness in the change of the conveyers may be taken up.

The operation of the device will be readily understood in connection with the above description. The cans of material to be passed through the machine are delivered to the conveyer 27, usually in parallel rows, and will be admitted into the casing one by one by the action of the wheels 36 and 37. They will drop from said wheels into the water within the casing and will be moved forwardly by the next cross bar 17 carried by the chains 16. The proper lifting arms 70 or 71 are then adjusted to cause the cans to pass out of the machine at the desired point, the curved track sections 90 being set opposite the guide tracks where the said lifting levers have been raised. The proper slides 58 have also been opened by operating the levers 69. The device needs no further attention and any desired amount of the goods may be fed continuously through the machine, the articles which are to be cooked a short time being separated and directed out of the machine earlier than those which are to be cooked longer. The rolling of the cans upon the spiral guidway within the machine insures a thorough cooking of the materials therein.

What I claim is:

1. An automatic cooker, comprising a casing, a guide-way mounted therein, a propeller for moving canned goods along said guide-way, and means for automatically delivering the cooked goods therefrom at a given point, in accordance with the time required for cooking the materials.

2. An automatic cooker for canned goods, comprising a casing having spirally arranged guiding and supporting tracks mounted therein, a conveyer having transverse slats extending across said guides and tracks for advancing the goods thereon, means for introducing goods upon said guide ways, and means for delivering the goods therefrom at a predetermined point.

3. An automatic cooker with spiral can ways for canned goods comprising a casing having a guiding track therein, a conveyer made up of chains having cross connecting propeller slats, adapted to engage the canned goods upon said guiding track means for delivering the canned goods therefrom at any desired point, and means for heating the contents of the casing of the machine.

4. An automatic cooker with spiral can ways for canned goods, comprising a can advancing conveyer, a casing carrying the same, said conveyer having driving shafts and transversely extending bars, means outside the casing for driving said chains, spiral guide tracks extending along the conveyer and arranged at an angle thereto so as to continually advance the goods from one side of the casing toward the other, means for lifting the goods from the conveyer at any desired point opposite the outlet of the machine, and guides for directing the goods from said outlet.

5. An automatic cooker, comprising a casing having an entrance opening at one end and a discharge opening at the other end, the said discharge opening extending the full width of the casing, means for introducing canned goods to be cooked into the entrance opening, a conveyer mounted therein, means for guiding the canned goods as it is propelled by said conveyer, and adjustable means capable of discharging the goods at any point along the spiral can way, whereby some goods may be allowed to remain in the cooker longer than other goods for accomplishing the cooking of the same to a proper degree.

6. An automatic cooker comprising a casing adapted to hold a fluid cooking agent, an inclined guide way for directing canned goods into said casing, the casing having an opening in the top thereof for receiving the same, coöperating socketed feed wheels adapted to introduce the cans into the mechanism one at a time, transverse bars mounted in the said casing, spiral guiding bars formed of T irons mounted upon said transverse bars, and adapted to guide canned goods within the casing, the said angle bars in the lower part of the machine also operating as supporting bars, inner longitudinal bars carried by the said transverse bars and supporting the canned goods part of the way, the angle bars being interrupted for a portion of their length near the discharge end of the machine, upwardly inclined bars leading from said interrupted portions of the angle bars to the discharge end of the machine, a conveyer for carrying the canned goods up the same to a discharge opening in the end of the machine, pivoted levers mounted below said openings, means for raising the said levers for lifting the cans so that they may pass out of the spiral can ways of the machine, and adjustable means for operating said lifting levers.

7. An automatic cooker, comprising a casing adapted to contain a fluid, a heating coil arranged within said casing for heating said water, spiral guiding and supporting rails surrounding said heating coil, a propeller also surrounding said heating coil and operating in conjunction with said guiding and supporting means for advancing canned goods to the machine, the said spiral guide rails having openings in their length near the discharge end of the machine, a transverse shaft mounted below the same, levers journaled thereon, some of said levers having lifting arms, spurs mounted adjacent to said levers and the said lifting arms, shafts carrying the same, operating handles outside the casing for turning said shafts, the spurs being set in different angular positions with respect to said shafts whereby some of the lifting levers may be raised while others are lowered, the raised levers being operable for directing the cooked materials out of the cooker, slides for closing the openings in said spiral guide rails where the canned goods are not being delivered, and levers for operating said slides.

8. In apparatus for treating packaged goods the combination of a cooking chamber, a package-way therein, means for moving packages along said way, and means for discharging packages from the way at different points to vary the length of travel of the packages in said chamber.

9. In apparatus for treating packaged goods the combination of a cooking chamber, a package-way therein, means for moving packages along said way, means for feeding packages to said way, and means for discharging packages from said way at different points to vary the length of travel of packages in said chamber.

10. In a can cooking apparatus the combination of a substantially closed cooking chamber through which the cans are moved, means for moving a plurality of series of cans through said chamber, and means for independently varying the length of travel of the cans in the respective series in said chamber.

11. In apparatus for treating packaged goods, the combination of a cooking chamber, a plurality of package-ways therein, means for simultaneously moving the packages along the ways, and means for varying the length of travel of the packages in any package-way.

12. In apparatus for treating packaged goods etc., the combination of a cooking chamber, means for simultaneously moving a plurality of series of cans through said chamber, and means for varying at will the length of travel of the cans in any series in said chamber.

13. In a can cooking apparatus the combination of a substantially closed cooking chamber, a plurality of can ways therein, means for simultaneously moving cans along the ways, and means for independently varying at will the length of travel of the cans in each way.

14. In apparatus for treating packaged goods etc., the combination of a cooking chamber, means for moving a plurality of series of packages through said chamber, means for varying at will the length of travel of the packages in each series so that the packages in the several series may be caused to travel for the same or different distances in the chamber.

15. In can cooking the combination of a substantially closed cooking chamber, means for guiding and moving a plurality of parallel series of cans through said chamber, and adjustable means for independently delivering the cans in each series so that the cans in the several series may be caused to travel for the same or different distances in the chamber.

16. In an apparatus for treating packaged goods and the like, the combination of a cooking chamber, a way in said chamber, means for moving packages along said way, means for feeding packages to said way, and means for discharging packages from said way, said discharge means being adjustable so as to vary the length of travel of the cans in said chamber.

17. In an apparatus for treating packaged goods and the like, the combination of a cooking chamber, a plurality of ways in said chamber, means for moving packages along said ways, means for feeding packages to said ways, and independent means for discharging packages from each way, said discharge means being adjustable so as to vary the length of travel of the cans in said chamber.

18. In a can cooking apparatus the combination of a substantially closed cooking chamber, a plurality of parallel can ways in said chamber, means for moving cans along such ways, means for feeding cans to each pathway, and means for discharging cans from each pathway, said discharge means being adjustable so as to vary the length of travel of the cans in each way within the chamber, substantially as described.

19. In a can cooking apparatus the combination of a substantially closed cooking chamber, a plurality of parallel can ways in said chamber, means for simultaneously moving cans along such ways, means for feeding cans to each way, independent means for discharging cans from each way, said discharge means being independently adjustable so as to vary the length of travel of the cans in each way, substantially as described.

20. In an apparatus for treating packaged goods, the combination of a cooking chamber through which the packages are moved, a package carrier within the chamber, and means for varying at will the length of travel of the packages relative to the length of the carrier and within the chamber, for the purpose specified.

21. An automatic cooker comprising a casing, a package-way therein, propelling means for moving the goods on the way, and means for switching packages at different points in the way so as to lengthen or shorten the time required for cooking the material contained in the packages.

In witness that I claim the foregoing I have hereunto subscribed my name this 30th day of June, 1913.

JOHN S. BAKER.

Witnesses:
EDMUND A. STRAUSE.
MARIE BATTEY.

Copies of this patent may be obtained for five cents each, by addressing the "Commissioner of Patents, Washington, D. C."